United States Patent [19]

Lundberg et al.

[11] 4,157,432

[45] Jun. 5, 1979

[54] BULK SULFONATION PROCESS

[75] Inventors: Robert D. Lundberg, Bridgewater; Henry S. Makowski, Scotch Plains, both of N.J.; Jan Bock, Houston, Tex.; Thomas Zawadski, Plainsboro, N.J.

[73] Assignee: Exxon Research & Engineering Co., Florham Park, N.J.

[21] Appl. No.: 855,692

[22] Filed: Nov. 29, 1977

[51] Int. Cl.$^2$ .......................... C08F 8/34; C08C 19/20
[52] U.S. Cl. .............. 526/31; 260/DIG. 31; 526/40
[58] Field of Search .............. 260/79.3 R, 79.5; 526/31, 40

[56] References Cited

U.S. PATENT DOCUMENTS

| | | | |
|---|---|---|---|
| 2,691,644 | 10/1954 | Roth | 260/79.3 R |
| 2,945,842 | 7/1960 | Eichhorn et al. | 260/79.3 R |
| 3,033,834 | 5/1962 | Roth | 260/79.3 R |
| 3,072,618 | 1/1963 | Turbak | 260/79.3 R |
| 3,158,583 | 11/1964 | Corte et al. | 260/79.3 R |
| 3,218,301 | 11/1965 | Moody et al. | 260/79.3 R |
| 3,642,728 | 2/1972 | Canter | 260/DIG. 31 |
| 3,836,511 | 9/1974 | O'Farrell et al. | 260/79.3 R |
| 3,859,264 | 1/1975 | Knudsen | 260/79.3 R |
| 3,887,530 | 6/1975 | O'Farrell et al. | 260/79.3 R |

*Primary Examiner*—Lewis T. Jacobs
*Attorney, Agent, or Firm*—Richard E. Nanfeldt

[57] ABSTRACT

A bulk sulfonation process for the preparation of sulfonated polymers from hydrocarbon polymers having olefinic unsaturation or aromatic moieties, or both, includes intimately mixing the polymer by mechanical means in the absence of a solvent for the polymers with a sulfonation reagent at a sufficient temperature and time to effect the desired degree of sulfonation. The sulfonated polymer may be recovered as the free sulfonic acid or neutralized ionically with a basic compound. Sulfonated polymers including a substantial proportion of aromatic moieties yield water-soluble or water-dispersible salts, useful as thickening and flocculating agents, when neutralized with ammonia monobasic cations or lower alkyl amines. These materials, however, when sulfonated at a low level, e.g. <10 mole SO$_3$ per mole aromatic, behave like water insensitive thermoplastics. Sulfonated elastomeric polymers yield thermoplastic elastomers which can be extruded, blow molded, injection molded and have utility as general purpose rubbers when neutralized with polyvalent cations or polyamines.

24 Claims, No Drawings

BULK SULFONATION PROCESS

BACKGROUND OF THE INVENTION

1. Field of the Invention

This invention relates to a process for the uniform sulfonation of elastomeric or thermoplastic polymers. More particularly, this invention is directed to a process for the preparation of sulfonated elastomeric or thermoplastic polymers from hydrocarbon polymers characterized before sulfonation by the presence in said polymers of sulfonatable sites selected from the group consisting of: olefinic unsaturation, which may be located in the polymer backbone chain of carbon atoms or in acyclic or alicyclic hydrocarbon groups pendant to the polymer backbone chain and arylene groups pendant to the polymer backbone chain of carbon atoms in which said backbone chain may be saturated, contain olefinic unsaturation and have appended to it unsaturated acyclic and alicyclic groups.

Most particularly, this invention is directed to a process for the bulk sulfonation of said unsaturated and aromatic ring containing polymers and mixtures of hydrocarbon polymers including said polymers which include:

(a) mechanically mixing, at an intensity which can vary from simply kneading or mastication to a high degree of shear, one or more of the polymers, or a mixture of hydrocarbon polymers including the polymers with a sulfonation reagent including sulfuric acid or sulfur trioxide, in the substantial absence of a solvent for the polymers, at a temperature which is higher than the glass transition temperature (Tg) of the polymers or mixture of polymers including the polymers in the case of amorphous polymers and is higher than the crystalline melt temperature (Tm) of the polymer or mixtures of polymers which are crystalline for a time sufficient to effect the desired degree of sulfonation; followed by (b) recovery of the free sulfonic acid of the polymer; or (c) neutralization with a basic material selected from the group consisting of ammonia, monoalkyl and polyalkylene amines, the compounds in which the cation is an element selected from the group consisting of Groups I-A, I-B, II-A and II-B of the Periodic Table of Elements, aluminum, antimony and lead; and the anion is selected from the group consisting of oxides, hydroxides, $C_1$ to $C_5$ alkoxides, carbonates, and carboxylic acids.

Sulfonated polymers made by the process of this invention when neutralized with monovalent and polyvalent cations can yield ionically cross-linked products which are elastomeric at ambient temperatures but are thermoplastic at elevated temperatures permitting the products to be extruded, blow molded, injection molded, sheeted and vacuum formed. Sulfonated polymers such as polystyrene, for example, yield on neutralization with alkalies, lower amines and the like, products useful as thickening agents as rigid foams and plastic-like applications. Sulfonated elastomers having 10 mole percent or less, preferably 0.2 to 5.0 mole percent of sulfonic acid groups incorporated therein, when ionically cross-linked or neutralized, may be blended with other polymers which may be amorphous or crystalline to yield compositions having novel physical properties.

2. Prior Art

Sulfonated polymers, varying in utility from water-soluble resins to ionically cross-linked thermoplastic elastomers are old in the art but virtually all processes described in patents and the chemical literature utilize a solvent for the polymer or synthesize the polymer from monomers possessing a sulfonic acid group. Exceptions involve surface sulfonation of covalently cross-linked polymers lacking thermoplastic or elastomeric properties. Examples of these processes include:

U.S. Pat. No. 2,533,210 describes the preparation of a water-soluble sulfonated polystyrene by sulfonating a polymer of styrene dissolved in a chlorinated solvent with a complex of $SO_3$ and bis ($\beta$-chloroethyl) ether.

U.S. Pat. No. 3,322,734 discloses the preparation of plastic polymers containing ionic cross-links by the copolymerization of styrene sulfonic acid with other monomers.

Vinyl sulfonic acid readily forms water-soluble homopolymers and copolymers with a variety of polar monomers but with the exception of styrene (Kern et al; Makromol. Chem. 32, 37 (1959)) attempts to copolymerize this monomer with hydrocarbon monomers, e.g. isobutylene and butadiene, failed. See Breslow et al, J. Poly. Sct. 27, 295 (1958).

The preparation of water-soluble sulfonic acids of natural rubber by reaction of a rubber cement with oleum or chlorosulfonic acid complexed with an ether or ester is described in German Pat. Nos. 550,243; 572,980; 582,565; and 585,623.

U.S. Pat. No. 3,218,301 discloses the sulfonation of a cross-linked vinyl polymer in the absence of solvent by passing gaseous $SO_3$ upwardly through a reactor containing particles of the polymer having a macroreticular structure and a size in the micron range at rate sufficient to fluidize the reactor contents.

British Patent No. 1,100,712 describes the production of an antistatic surface treatment for polystyrene articles using a bath of an aliphatic hydrocarbon and chlorosulfonic acid.

Recently, U.S. Pat. Nos. 3,072,618; 3,642,728; and 3,836,511, which are herein incorporated by reference, have disclosed the preparation of novel sulfonic acid ionomers of unsaturated elastomers by reaction of the polymers in solution with a variety of organic complexes of sulfuric acid and sulfur trioxide.

SUMMARY OF THE INVENTION

In contrast to the solution, gaseous diffusion or surface sulfonation processes of the prior art we have now found that a wide variety of unsaturated and aromatic ring containing polymers may be sulfonated in the bulk, in the substantial absence of solvents for the polymers, by intimately mixing with the aid of a mechanical device to a degree which may result in shear of the polymer, a mixture of the polymer and a sulfonation reagent, for e.g. sulfuric acid, chlorosulfonic acid or sulfur trioxide or both, at a temperature in which the polymer is in a plastic state, defined herein as a temperature which is above the glass transition temperature (Tg) of the polymer or mixture of polymers; in the case of amorphous (non-crystalline) polymers will generally be at a temperature which is intermediate to the Tg and below 250° C. and in the case of polymers having a fair degree of crystallinity (greater than 10%) will be higher than the crystalline melting point and below 250° C. A satisfactory reaction temperature where most polymers will have the desired degree of plasticity preferably will generally be in the range between 1 and 2.5 times the glass transition temperature when both are measured in degrees Kelvin.

Preferred reagents for sulfonating the polymers comprise organic complexes and coordination compounds of sulfuric acid or sulfur trioxide with acid anhydrides and Lewis bases. The sulfonated polymers can be recovered as the free sulfonic acid or neutralized and ionically cross-linked with a variety of cations or counterions. Those polymers which have Tg's>250° C. or have crystalline melting points (Tc)>250° C. generally will not fall within the scope of this invention unless a nonvolatile additive present in minor amounts effectively reduces the Tg or Tc below 250° C. under the conditions of reaction.

DESCRIPTION OF PREFERRED EMBODIMENTS

1. Polymers

Polymers which are conceptually suitable for the bulk sulfonation process of this invention include:

(a) homopolymers and copolymers of one or more conjugated diolefins such as 1,3-butadiene, isoprene, 2,3-dimethyl-1,3-butadiene, piperylene, cyclopentadiene, myrcene and ocimene. Enchainment, using a variety of catalysts for the polymerization, includes 1,4-cis; 1,4-trans; 1,2- and 3,4- types of additions and mixtures thereof. Non-limiting examples include: natural rubber; 1,4-cis poly(1,3-butadiene); 1,4-cis polyisoprene; and a random 1,4-cis and 1,4-trans polybutadiene having equal parts of each stereoisomer made by Ziegler catalysts as disclosed in Belgian Patent No. 543,292 (1955).

(b) homopolymers and copolymers of one or more alkenyl aromatic hydrocarbons and substituted derivatives thereof having the general formula Ar-C(R)=CH$_2$ wherein Ar is a monovalent sulfonatable aromatic radical and R is hydrogen or methyl. Non-limiting examples include: solid, thermoplastic polymers and copolymers of styrene, α-methyl styrene, vinyl toluene, vinyl naphthalene, and vinyl ethylbenzene.

(c) copolymers of one or more C$_4$ to C$_{10}$ conjugated dienes with one or more C$_8$ to C$_{12}$ vinyl aromatic hydrocarbons. Non-limiting examples include: copolymers of 1,3-butadiene with styrene, e.g. GRS rubber and graft polymers of styrene or polybutadiene.

(d) random copolymers of one or more C$_8$ to C$_{12}$ vinyl aromatic hydrocarbons comprising about 40 to 60 wt. % of the vinyl aromatic with one or more C$_4$ to C$_8$ Type III monoolefins. Non-limiting examples include the copolymers of styrene and isobutylene.

(e) random elastomeric copolymers of one or more C$_4$ to C$_{10}$ conjugated dienes with one or more C$_4$ to C$_8$ Type III monoolefins. Non-limiting examples include the family of rubbers comprising copolymers of isobutylene with butadiene, isoprene and piperylene.

(f) random interpolymers of one or more Type I C$_2$ to C$_{18}$ monoolefins and one or more C$_6$ to C$_{12}$ non-conjugated acyclic or alicyclic diolefins. Non-limiting examples of commercially available polymers include: terpolymers of ethylene, propylene and 1,4-hexadiene; ethylene, propylene and dicyclopentadiene; and terpolymers of ethylene, propylene and 5-ethylidene-2-norbornene. Olefin types are in accordance with the Schmidt and Boord Classification, JACS 54, 751 (1932).

While the above polymers provide a broad range of materials which are conceptually suitable for this reaction, we have observed that those polymers containing substantial levels of unsaturation are prone to be cross-linked much more readily than those having reduced unsaturation levels. Therefore, it is preferred that those polymers having unsaturation ranges suitable to provide polymer sulfonic acid products with acid functionality in the range of about 10 meq up to about 200 meq be employed in this invention.

It is apparent, therefore, that this limitation excludes homopolymers having high unsaturation levels such as polybutadiene, polyisoprene, polypentamine, etc.

All of the above polymers are either thermoplastic or elastomeric and may range in their degree of crystallinity at ambient temperatures from amorphous solids to a crystallinity in excess of 90 percent. The polymers may be blended prior to, or after sulfonation and ionic cross-linking, with other polymers such as polyethylene, polypropylene, and copolymers of ethylene and propylene having a range of crystallinity.

2. Sulfonation Reagents

In addition to sulfuric acid having a range of concentrations of from 95.5 percent to Oleum (104.5 percent) a variety of organic addition, coordination and complex compounds of sulfuric acid, chlorosulfonic acid and sulfur trioxide have been described in the chemical and patent literature which are suitable as sulfonating reagents in the process of this invention. Non-limiting examples of suitable reagents include: sulfuric acid having a strength in the range of about 95 wt. % to Oleum containing 20 wt. % of SO$_3$; chlorosulfonic acid; stabilized liquid SO$_3$; and 1:1 or 1:2 addition compounds of 100 percent sulfuric acid, chlorosulfonic acid and sulfur trioxide with: acyl compounds, e.g. carboxylic acids; acid anhydrides; perfluorinated acids; ethers; thioethers; alkyl esters; dialkylformamides; and a variety of Lewis bases. Non-limiting examples of specific compounds which form adducts or complexes with the said acids and sulfur trioxide are: diethylether, acetic acid, acetic anhydride, trifluoroacetic acid, benzoic anhydride, trifluoro acetic anhydride, benzoic acid, propionic acid, η-butyric acid, dioxane, tetrahydrofuran, 1,4-oxathiane, pyridine, dimethylaniline, N-ethylmorpholine, dimethylformamide, dimethyl sulfone, dimethyl sulfoxide, sulfolane, triethyl phosphate, hexamethyl phosphoramide and bis (βchloroethyl) ether. Preferred, is acetic anhydride and sulfuric acid.

3. Mechanical Mixing Equipment

A wide variety of machines are available in the plastics and rubber industry for mixing, with varying degrees of shear (from about 10 sec$^{-1}$ to greater than about 1000 sec$^{-1}$) resinous and elastomeric materials with solid or liquid reagents under controlled conditions of temperature, mechanical pressure and atmosphere. Prior to reaction with a sulfonation reagent, thermoplastic polymers such as polystyrene may be in bead form as a result of the method used for polymerization, or reduced to a small particle size by pelletizing, and elastomeric polymers granulated by passage through a mechanical chopper. The equipment used for mixing the polymer with the sulfonation reagent, whether done in a bath, semi-continuous, or fully continuous process must exert sufficient stress at the temperature of operation in order to ensure plasticity of the mixture. Non-limiting examples of suitable batch equipment are: the Banbury Mixer; similar mixers equipped with helical "sigma" blades rotating in opposite directions in a divided trough or saddle with either overlapping blades rotating at the same speed, or non-overlapping blades rotating at differential speeds; and the Bramley Beken Blade Mixer equipped with input shaft speeds of about 20 to 80 rpm. All of the above types of mixers may be fitted with jackets or cored blades through which heat-exchange media may be circulated for controlling the temperature. The Brabender Plasticorder having a mixing head made from stainless steel with a capacity of about 25 cc and auxiliary constant water or oil bath is particularly suitable for small-scale laboratory sulfonations.

Continuous or semi-continuous sulfonations are preferably performed in temperature controlled single or multiple screw extruders fabricated from hardened, corrosion resistant alloys. The screws may have variable geometry such as helix angle, root diameter, lead or pitch, interrupted flights and ratios of length to diameter (L/D). The barrel may be fitted with injection ports for addition of reagents and vent ports connected to a vacuum system downstream from the reaction zone for the removal of volatile by-products of the reaction. Screws comprising a reactor section having individually spaced apart, offset, discontinuous, helical flights of the type disclosed in U.S. Pat. No. 3,884,451, which is herein incorporated by reference, are particularly preferred.

4. Process Conditions

A. Reagent Formulation and Addition

The method used for formulation and addition of the sulfonation reagent to the polymer may vary depending on the composition of the reagent, the rapidity with which the particular polymer sulfonates, and whether a batch or continuous process is used.

In a batch process, using for example "acetyl sulfate" which may be prepared by the addition of sulfur trioxide to acetic acid at a temperature below 0° C., or by the addition of 1.0 mole of 100 percent sulfuric acid to 1.0 mole of acetic anhydride, the entire amount of externally prepared reagent required to obtain the desired level of sulfonation of the polymer may be added to the polymer after the polymer has been mixed to the desired degree of plasticity in a single dump or the externally prepared reagent may be added to the plasticized polymer in increments at intervals.

Alternatively, the reagent may be prepared in situ by the serial addition of all of the acetic anhydride to the plasticized polymer, mixing thoroughly and then adding the sulfuric acid in a slow stream or in discrete incremental amounts. Another method is the alternate addition of incremental amounts of acetic anhydride and sulfuric acid to the plasticized polymer beginning with the acetic anhydride.

In a continuous process, using again "acetyl sulfate" as the sulfonation reagent, and an extruder having one or more reaction zones, the reagent prepared externally may be added to the polymer after it has reached the desired degree of plasticity in a single stream in a single reaction zone or in split streams when more than one reaction zone is used. Alternatively, the acetic anhydride may be added to a first mixing or reaction zone, followed downstream in a second mixing or reaction zone with the sulfuric acid. Other complexing agents can be handled in a similar manner when used in batch or continuous processes. Alternatively, the sulfonation reagent may be "dry blended" at ambient or lower temperatures with the polymer, previously reduced to a fine particle size, in an atmosphere free of oxygen and moisture and the mixture fed to the extruder for reaction.

B. Reaction Temperature and Time

In the bulk sulfonation of polymers as encompassed in the process of this invention, it is essential that the polymer be in a state of plasticity to permit uniform distribution of the sulfonation reagent throughout the entire mass of the reaction mixture. The temperature at which reaction occurs will accordingly be above the glass transition temperature (Tg) and for a completely amorphous polymer will generally be above Tg and below 250° C. Polymers having a measure of crystallinity or comprising crystalline segments will be sulfonated at temperatures which will be generally above the crystalline melt temperature (Tc) and below 250° C. Expressed in terms of Absolute Temperature, the preferred temperature range for the sulfonation is between 1 and 2.5 times the glass transition temperature of the polymer when both are measured in degrees Kelvin, but below 523° K.

While sulfonation reactions, particularly with aromatic compounds, are generally exothermic the use of complexes of sulfuric acid and sulfur trioxide results in an attenuation of the reaction and some heat must be supplied to the reaction mixture. However, the major source of the heat developed in the reaction mixture is due to the stress and resulting shear induced by the mechanical action of the mixing equipment and heat-exchange means must be supplied to maintain the reaction mixture within the desired temperature limits. For a number of polymers which have been studied, such as EPDM, polystyrene, copolymers of isobutylene and isoprene, an initial mixing temperature in the range of about 100° C. to 180° C. appears to be satisfactory.

In these reactions, many factors influence the selection of suitable reaction conditions. Specifically, the major factors which are important in conducting these bulk sulfonation reactions are:

(a) polymer backbone type
(b) sulfonation reagent, and concentration
(c) reaction temperature
(d) reaction time The preferred polymer backbone in conducting these reactions are those containing relatively low levels of unsaturation, as have already been described, or those saturated polymers containing aromatic groups. Polymers which contain levels of unsaturation sufficient to give a sulfonic acid level of about 10 to about 200 meq are preferred with levels of 10 to 50 being most preferred. Ethylene propylene terpolymers (EPDM) are available commercially that can fall into this range of unsaturation. When using polymers which have this level of unsaturation, it has been observed that the reactions between sulfonation reagent and polymer can be very rapid at moderate temperatures (50° to 100° C.). It is preferred to conduct these reactions between unsaturated polymer and sulfonating reagent under the most moderate conditions which are possible, yet being consistent with the fluidity of the polymer melt and high conversion of the sulfonation reaction. The data shown below demonstrate that this can be accomplished with EPDM and Butyl rubber at temperatures between 50 and 125° C. for times ranging from 1 minute and 30 minutes.

If higher temperatures are employed, it is desirable to conduct the reaction with more intensive mixing and for shorter periods of time to avoid degrading the polymer prior to the addition of the neutralization agent. For example, it would be conceptually feasible to conduct the sulfonation of EPDM at 225° C. However, under these conditions, the employment of a very reactive sulfonation reagent would induce undesirable side reactions. Therefore, with this system, it is necessary to employ less extreme conditions for sulfonation (i.e. lower temperatures, less reaction time with the sulfonation agents—preferably 1 to 10 minutes, and moderate sulfonation agents or complexes).

On the other hand, we have observed that the polymer sulfonic acids derived from polystyrene are more stable than those derived from EPDM and other unsaturated polymers. As a consequence of this apparently better stability and, possibly the slower reaction between sulfonating agent and the aromatic moiety, these reactions can be conducted at somewhat higher temperatures than would be the case with EPDM. However, it should be emphasized that there is evidence that these sulfonating agents (specifically acetyl sulfate) can undergo side reactions at moderate temperatures and, therefore, this can provide an upper limit to the temperature and residence time for this reaction. Obviously, these side reactions involving the sulfonating complexes will be quite dependent on the nature of the particular complex, the temperature of its utilization, and the time during which it is reacted before neutralization. The specific examples delineated below provide information on the conditions for sulfonation of both EPDM and polystyrene. Based on the discussion above and the data below, we prefer an upper temperature limitation for these reactions as being less than 250° C., and preferably less than 225° C. In the case of unsaturated polymers, it is most preferable that the upper temperature for sulfonation be less than 150° C. In the case of aromatic polymers, it is most preferred that the upper temperature limit for sulfonation be less than 200° C.

Depending on the amount and type of polymer to be sulfonated, the composition and manner of addition of the sulfonation reagent, the temperature of the reaction mixture and the intensity of the mixing supplied by the mechanical equipment, reaction times in the range of 2 minutes to 1 hour, e.g. 6 to 30 minutes have been found to be adequate for the sulfonation of a broad spectrum of polymers.

In continuous sulfonations where the initial mixing of the polymer and the sulfonation reagent is conducted for example in an extruder, additional time for the completion of the reaction, if necessary, may be obtained by discharging the extrudate into a jacketed Banbury or kneader maintained at reaction temperature and operated under vacuum to remove volatiles.

The mole ratio of the sulfonation reagent to either the number of aromatic rings or the olefinic unsaturation or both used to effect sulfonation may be varied over a wide range, e.g. 0.2–5.0 moles of reagent calculated on the basis of the $SO_3$ content per mole of aromatic or double bond. With certain Lewis bases (e.g. tetrahydrofuran, THF) the ratio of available $SO_3$ to the Lewis base in the complex may also be varied from an equimolar complex to one having 3 moles of THF per mole of $SO_3$. In the case of unsaturated polymers having an unsubstituted allylic methylene the sulfonation reaction can be nearly quantitative under optimum conditions of sulfonation. The conversion obtained varies with the type of polymer, composition and mole ratio of the sulfonation reagent and the specific conditions and equipment employed.

This invention has been described as a bulk sulfonation process. This is meant to distinguish such a process from the prior art process of sulfonations conducted on polymer solutions. These solution sulfonations are normally conducted with a minor amount by weight of polymer dissolved in non-reactive solvent. As such, the viscosities of such solutions are in the range of 2000 to 10,000 centipoise. These are considered the viscosities of solutions in which chemical reactions can be conducted in a reproducible manner to achieve homogeneous products.

The instant invention is substantially different from these solution sulfonations. The viscosity of the reaction medium is many times higher, ranging from 20,000 up to 1,000,000 centipoise or more. Under these conditions the reaction of polar sulfonating reagents in the non-polar medium is not readily predictable. It is essential for the products of this invention that this reaction be controlled sufficiently to provide products which are homogeneously sulfonated (as opposed to surface sulfonation), of uniform sulfonation level, that the products be substantially free of covalently crosslinked product (e.g. sulfones) and that the reactions be effected in a reproducible manner. Aside from the extremely high viscosities of these reaction media, and the lack of homogenity between the polar sulfonating agents and the relatively non-polar polymers, there is also the problem of the extreme rapidity of the reaction which could lead to gelled products of little utility. In view of all of the obstacles to this reaction, it is indeed surprising that the bulk sulfonation reaction proceeds smoothly and controllably.

The reaction of certain sulfonating agents such as gaseous $SO_3$ with undissolved polymer is not unknown. It is important to distinguish the instant invention from that prior art. The instant invention does not contemplate the use of gaseous sulfonating agents. In fact, they are undesirable because they are extremely reactive are non-discriminatory in attack crosslinking degradation. Furthermore, the instant invention is not concerned with solid state sulfonation, i.e. surface sulfonation, wherein it is not relevant whether a crosslinked polymer is formed since generally it will be employed in the shape it is in when contacted with the sulfonating reagent.

In the instant invention it is required that the polymer be in a state of flux, i.e. the instant process depends on such polymer fluxing to disperse the sulfonating reagents throughout the reaction environment. It is important to note that certain non-volatile hydrocarbon additives can be incorporated into the polymer to be sulfonated in order that the fluxing be effected more readily or at a lower temperature. For example, the addition of hydrocarbon paraffinic oils to ethylene propylene terpolymer will lower the melt viscosity and expedite the reaction. It is important to note that such a mixture constitutes a bulk sulfonation system since the oil or additive will constitute less than 100 parts per 100 parts of polymer to be sulfonated. Furthermore, these additives will be non-volatile and thereby be compatible with and part of the sulfonated polymer phase. In addition to the oils, selected polymers can be added, e.g. ethylene propylene copolymer, polyethylene, polypropylene and the like can be incorporated into the EPDM to be sulfonated. These additives will not normally react with the sulfonating or neutralization agents. For other polymers, similar oils or plastic additives can be incorporated.

In all cases, the reactions envisioned in this invention will be conducted in a very viscous polymer melt. The viscosity of this melt will preferably be in the range of 50,000 centipoise up to and exceeding 10,000,000 centipoise when measured at shear rates of about 1 sec$^{-1}$. This range of viscosities will generally be those manifested by the polymer before sulfonation or neutralization. It is even more preferred that this range of viscosities be about 100,000 centipoise up to 5,000,000 centipoise. Obviously, the temperature of the reaction medium can be adjusted to achieve these viscosity ranges. It is intended that this description of melt viscosities be descriptive of the characteristics of the reaction medium. However, under exceptional conditions, reactions can be conducted outside of these ranges. It is intended that such reactions fall within the scope of this invention.

C. Neutralization and Recovery

The sulfonated polymers made by the process of this invention may be recovered in the form of the free sulfonic acid or neutralized and recovered as a salt of the hereinbefore stated cations or counterions.

The free sulfonic acid may be recovered by dissolving the sulfonation mixture in a mixed solvent, for example toluene to which has been added between 5 to 10 volume percent of isopropanol, ethanol or methanol, at a concentration in the range of about 5 to 20 weight percent, and adding the solution of the sulfonated polymer to about 20 volumes of boiling water. The sulfonated polymer is precipitated in the form of small particles which can be filtered and at the same time the solvents are flashed off and can be recovered overhead. The polymer may be dried by kneading in acetone followed by solvent removal under vacuum or dewatered through an extruder.

Neutralization or ionic crosslinking with an appropriate cation or counterion may be done directly in the same equipment used for the sulfonation at the completion of the sulfonation reaction after which other polymers, fillers, antioxidants, plasticizers, extenders and the like may be blended with the neutralized polymer.

Polymers having olefinic unsaturation prior to sulfonation, retain in large part their olefinic unsaturation after sulfonation and can be covalently crosslinked by conventional vulcanizing agents such as sulfur. The advantages of the bulk sulfonation process of this invention will be more readily appreciated by reference to the following examples.

EXAMPLE 1

Seventeen grams of a terpolymer of ethylene, propylene and 5-ethylidene-2-norbornene (EPDM) in the gum state having an ethylene content of 51 weight percent, determined by the method of Gardner, Cozewith and VerStrate: Rubber Chem. & Tech. 44, 1015 (1971), an ethylidene norbornene content of 4.2 weight percent, a number average molecular weight ($\overline{M}n$) of 65,000 and a crystallinity of less than 20 weight percent as determined by the method of VerStrate and Wilchinsky: J. Poly. Sci A-2, 9, 127 (1971) which had incorporated therein about 0.5 weight percent of 2,2'-methylene-bis (4-methyl-6-ter-butylphenol) as an antioxidant was sheeted on a two roll mill, cut into strips and added to a 25 cc Brabender Plasticorder fitted with a constant temperature bath maintained at 50° C. and worked until the temperature of the melt had reached 85° C. which required about 1 minute, whereupon 0.70 grams of acetic anhydride having a strength of 97.4 weight percent was added dropwise to the molten polymer over the course of 4 minutes at the end of which time 0.51 grams of 96.5 weight percent of sulfuric acid was added dropwise over the course of 3 minutes followed by an additional mixing time of 10 minutes at the end of which time the temperature had risen to 103° C. and the mixture had a viscosity on the recorder of 1630. To the mixture was now added 4.68 grams of finely powdered zinc stearate ($ZnSt_2$) and the mixing continued for 12 minutes at the end of which time the temperature had risen to 116° C. and the viscosity had leveled out at 2170. When cooled and milled, the product had a light tan to caramel color and surface roughness and snapback characteristics of crosslinked elastomers. The high torque values obtained on the Brabender are also characteristic of solution sulfonated EPDM as the free sulfonic acid and when ionically crosslinked with zinc stearate.

EXAMPLES 2–5

Four experimental runs were made in the 25 cc Brabender Plasticorder in which Example 1 was essentially repeated with the exception that the acetic anhydride to sulfuric acid ratio were varied. Seventeen grams of the same EPDM and 4.68 grams of $ZnSt_2$ were used in all runs, the bath temperature was 50° C. and the order of addition of the reagents was the same as in Example 1. The experimental details of Examples 1–5 and the results obtained are given in Table 1.

TABLE I

| Example No. | Ex. 1 | Ex. 2 | Ex. 3 | Ex. 4 | Ex. 5 |
|---|---|---|---|---|---|
| Reactants - Gms. | | | | | |
| EPDM | 17 | 17 | 17 | 17 | 17 |
| Ac$_2$O | 0.70 | 0.70 | 0.70 | 2.8 | 0.23 |
| H$_2$SO$_4$ | 0.51 | 2.03 | 0.16 | 0.51 | 0.51 |
| ZnSt$_2$ | 4.68 | 4.68 | 4.68 | 4.68 | 4.68 |
| Time for Ac$_2$O Addition | 4.0 min. | 4.0 min. | 4.0 min. | 4.0 min. | 4.0 min. |
| Time for H$_2$SO$_4$ Addition | 3.0 min. | 10.0 min. | 2.0 min. | 3.0 min. | 3.0 min. |
| Condition Before ZnSt$_2$ Addition | | | | | |
| Temperature, °C. | 103 | 87 | 98 | 82 | 95 |
| Brabender Viscosity | 1630 | 1510 | 1350 | 920 | 1500 |
| Final Conditions | | | | | |
| Temperature, °C. | 116 | 106 | 105 | 101 | 103 |
| Brabender Viscosity | 2170 | 1860 | 1660 | 1400 | 1880 |
| Total Blend Time, Min. | 30 | 24 | 19 | 28.5 | 20.5 |

Examination of the torque measurements is indicative of the sulfonation efficiencies that were obtained. Prior experience has shown that the higher the free-acid and final neutralized viscosities, the higher the degree of sulfonation. From the above, it is apparent that from the variety of conditions that were studied in this series of experiments that the reagent ratios used in Example 1 in which the mole ratio of acetic anhydride to sulfuric acid is close to unity gave the best results. On the other hand, when either reagent was present in substantial excess poorer sulfonation efficiencies, as judged by torque determinations, were obtained.

EXAMPLES 6 AND 7

Two experimental runs were made in the Brabender Plasticorder in which the procedure used in Example 1 was repeated with the exception that the absolute level of the sulfonation reagent was increased while the mole ratio of acetic anhydride to sulfuric acid was the same as in Example 1. The results are given in Table II. The data of Example 1 are included for comparison.

TABLE II

| Example No. | Ex 1 | Ex. 6 | Ex. 7 |
|---|---|---|---|
| Reactants - Gms. | | | |
| EPDM | 17 | 17 | 17 |
| $Ac_2O$ | 0.70 | 1.40 | 2.10 |
| $H_2SO_4$ | 0.51 | 1.01 | 1.52 |
| $ZnSt_2$ | 4.68 | 4.68 | 4.68 |
| Time for $Ac_2O$ Addition | 4.0 min. | 4.0 min. | 4.0 min. |
| Time for $H_2SO_4$ Addition | 3.0 min. | 3.0 min. | 3.0 min. |
| Conditions before $ZnSt_2$ Addition | | | |
| Temperature, °C. | 103 | 95 | 78 |
| Brabender Viscosity | 1630 | 1620 | 580 |
| Final Conditions | | | |
| Temperature, °C. | 116 | 118 | 125 |
| Brabender Viscosity | 2170 | 2480 | 2430 |
| Total Blend Time-Minutes | 30 | 20.5 | 23 |

It will be observed from the data in Table II that the use of higher levels of the sulfonation reagent result in increased viscosity after neutralization. The results are consistent with a higher degree of sulfonation of the polymer and as a consequence an indication of a higher degree of ionic crosslinking.

EXAMPLE 8

Samples, suitable for testing for tensile strength and elongation were prepared from a quantity of EPDM ionomer prepared as in Example 1 by injection molding the $ZnSt_2$ neutralized bulk sulfonated EPDM at 150° C. into a cold mold using a 60 gram Watson-Stillman injection molding machine. The tensile strength of the sample was 36.5 kilo/cm$^2$ at a cross-head speed of 5.0 cm per minute and the elongations at break were on the order of 300%. The results demonstrate that ionically crosslinked ionomers prepared by the bulk sulfonation process of this invention can be injection molded using conventional melt fabrication equipment to yield elastomeric products having good physical properties.

EXAMPLE 9

Example 1 was repeated except that the temperature of the constant temperature bath was raised from 50° C. to 100° C. but was the same in all other respects. The observed temperatures at the completion of the sulfonation was 111° C. and at the completion of the $ZnSt_2$ addition was 124° C. The observed torque at the end of the run was 2140 which is within the experimental duplication of Example 1. This experiment illustrates that the bulk sulfonations can be conducted over a range of temperatures.

EXAMPLE 10

In order to determine the effect of alternative methods of reagent addition, Example 1 was repeated except that the acetic anhydride and the sulfuric acid were alternately added dropwise to the molten EPDM over the course of 1 minute, the reaction mixture held for 2 minutes from the time the viscosity leveled out, the zinc stearate added in 0.5 minute and the neutralized reaction mixture held for an additional 4 minutes. The results are given in Table III. The data from Example 1 are repeated in Table III for comparison.

EXAMPLE 11

A third method for sulfonating the EPDM used in Example 1 employed pre-formed acetyl sulfate made by the dropwise addition of 51.6 grams of 96.5 weight percent sulfuric acid, precooled to −10° C. to 50.0 grams of 97.4 weight percent of acetic anhydride, with stirring, while maintaining the mixture at a temperature of −10° C. Example 1 was repeated, except that 1.35 grams of the preformed acetyl sulfate was added over the course of 18 minutes. It was observed that the oily character of the reagent, which was maintained at a low temperature, acted as a lubricant for the walls of the mixing chamber and necessitated a longer mixing time before the viscosity leveled out. The overall effect was a lower final viscosity which was related to the mixing efficiency of the equipment. The results are given in Table III.

TABLE III

| Example No. | Ex. 1[a] | Ex. 10[b] | Ex. 11[c] |
|---|---|---|---|
| Reactants - Gms. | | | |
| EPDM | 17 | 17 | 17 |
| $Ac_2O$ | 0.70 | 0.70 | — |
| $H_2SO_4$ | 0.51 | 0.51 | — |
| $CH_3COOSO_3H$ | — | — | 1.35 |
| $ZnSt_2$ | 4.68 | 4.68 | 4.68 |
| Time for $Ac_2O$ Addition | 4.0 min. | 1 | — |
| Time for $H_2SO_4$ Addition | 3.0 min. | 1 | — |
| Time for $AcOSO_3$ | — | — | 1 |
| Conditions Before $ZnSt_2$ Addition | | | |
| Temperature, °C. | 103 | 90 | 92 |
| Brabender Viscosity | 1630 | 1670 | 1450 |
| Final Conditions | | | |
| Temperature, °C. | 116 | 115 | — |
| Brabender Viscosity | 2170 | 2300 | 1900 |
| Total Blend Time-Minutes | 30 | 8.5 | 32 |

[a] Dropwise addition of all of the $Ac_2O$ followed by dropwise addition of all of the $H_2SO_4$.
[b] Alternate dropwise addition of $Ac_2O$ and $H_2SO_4$.
[c] Dropwise addition of preformed acetyl sulfate While the lower viscosity of the neutralized product obtained in Example 11 would suggest that the use of preformed acetyl sulfate is less efficient than serial addition or alternate addition of the reagents, the slippage and poorer mixing accounts for the lower viscosity.

EXAMPLE 12

A blend of zinc stearate-neutralized sulfonated EPDM, prepared as in Example 1 was made with a high density polyethylene (HDPE) which had a density of 0.96 g per cc., a crystalline content in excess of 80 wt. % and a melt index of 6.0. The compounded blend had an overall composition of 27.4 grams of the $ZnSt_2$ neutralized sulfonated EPDM; 14.8 grams of the HDPE; 6.6 grams of zinc oxide; 0.5 grams of magnesium oxide; and 0.4 grams of 2,2'-methylene-bis (4-methyl-6-ter-butylphenol) antioxidant.

The procedure employed in preparing the blend was as follows: To the Brabender mixing head, maintained at 180° C. by means of the constant temperature bath was added the HDPE, followed by the neutralized sulfonated EPDM within 0.5 minutes, the antioxidant within 1 minute, followed by the zinc oxide and magnesium oxide for a total mixing time of 10 minutes. The compounded blend was then sheeted on a cold two roll mill and samples for tensile strength prepared by injection molding at 150° C. in a Watson-Stillman press into a cold mold.

The tensile strength as measured was found to be 105.5 Kg/cm² at a cross-head speed of 5.0 cm per minute and the elongation at break was 208%. The above compositions, which are disclosed in U.S. patent application, Ser. No. 524,502 filed Nov. 18, 1974, which is herein incorporated by reference, possess improved processability and compression set properties.

EXAMPLE 13

Seventeen grams of an unmodified general purpose polystyrene was added to the mixing head of the Brabender Plasticorder with the constant temperature bath maintained at 165° C. After about 2 minutes of mixing, the melt temperature had reached 156° C. and the fluxed polymer gave a torque reading of 2200. To the molten resin was then added over the next 7 minutes, 0.91 grams of acetic anhydride followed by 0.66 grams of concentrated sulfuric acid. The temperature remained unchanged and the torque reading had decreased to 1100. At this point, 0.60 grams of zinc oxide was added to the reaction mixture and mixing continued for an additional 8 minutes at which time the torque reading had leveled out at 2800. The high torque reading is consistent with data obtained with zinc oxide-neutralized sulfonated polystyrenes having the same degree of sulfonation, made by a solution process.

The above examples clearly show that polymers comprising olefinic unsaturation or aromatic rings can readily be sulfonated in the bulk with suitable sulfonating reagents. While zinc stearate and zinc oxide have been used in the above examples to neutralize the sulfonated polymers, other metallic salts, oxides and hydroxides are also suitable. Similarly, while acetic anhydride and sulfuric acid, used serially or alternately or in the form of pre-formed acetyl sulfate have been used in the above examples as the sulfonation reagent, other reagents detailed above are also suitable, particularly in those instances where isolation of the polymer in the form of the free sulfonic acid is desired.

What is claimed is:

1. A process for the bulk sulfonation of hydrocarbon polymers, characterized before sulfonation, by the presence in said polymers of sulfonatable sites selected from the group consisting of olefinic unsaturation and arylene radicals, which comprises:
   (a) mechanically mixing said polymers or mixtures of hydrocarbon polymers comprising said polymers with a sulfonation reagent comprising sulfuric acid or sulfur trioxide or both, in the substantial absence of a solvent for said polymers at a temperature which is between the glass transition temperature and 250° C. for amorphous polymers and between the crystalline melting point and 250° C. for crystalline or semicrystalline polymers for a time sufficient to effect sulfonation; followed by
   (b) recovering said sulfonated polymers and said mixtures.

2. Process according to claim 1 wherein said hydrocarbon polymers are selected from the group consisting of:
   (a) homopolymers and copolymers of one or more alkenyl hydrocarbons having the general formula Ar-C(R)=CH$_2$ wherein Ar is a monovalent sulfonatable aromatic radical and R is hydrogen or methyl;
   (b) copolymers of one or more C$_4$ to C$_{10}$ conjugated diolefins with one or more C$_8$ to C$_{12}$ vinyl aromatic hydrocarbons;
   (c) random copolymers of one or more C$_8$ to C$_{12}$ vinyl aromatic hydrocarbons comprising about 40 to 60 weight percent of said vinyl aromatic with one or more Type III C$_4$ to C$_8$ monoolefins;
   (d) random elastomeric copolymers of one or more C$_4$ to C$_{10}$ conjugated diolefins with one or more Type III C$_4$ to C$_8$ monoolefins; and
   (e) random interpolymers of one or more Type I C$_2$ to C$_{18}$ monoolefins and one or more C$_6$ to C$_{12}$ nonconjugated acyclic or alicyclic diolefins.

3. Process according to claim 1, wherein said sulfonation reagent is a pre-formed acetyl sulfate.

4. Process according to claim 1, wherein said sulfonation reagent is prepared in situ by the serial addition of acetic anhydride and sulfuric acid.

5. Process according to claim 1, wherein said sulfonation reagent is prepared in situ by the alternate addition of acetic anhydride and sulfuric acid.

6. Process according to claim 1, wherein said sulfonation reagent comprises a complex or coordination compound of sulfuric acid or sulfur trioxide with a Lewis base.

7. Process according to claim 1, wherein said polymer is an unmodified polystyrene.

8. Process according to claim 1, wherein said polymer is a butyl rubber.

9. Process according to claim 1, wherein said polymer is an EPDM selected from the group consisting of terpolymers of ethylene, propylene and 1,4-hexadiene, and terpolymers of ethylene, propylene and 5-ethylidene-2-norbornene.

10. Process according to claim 1, wherein said sulfonation reagent is selected from the group consisting of adducts or complexes of sulfuric acid or sulfur trioxide with diethyl ether, acetic acid, acetic anhydride, trifluoroacetic acid, trifluoroacetic anhydride, benzoic acid, benzoic anhydride, propionic acid, n-butyric acid, dioxane, tetrahydrofuran, 1,4-oxathiane, pyridine, dimethylaniline, n-ethylmorpholine, dimethylformamide, dimethyl sulfone, dimethyl sulfoxide, triethyl phosphate, hexamethyl phosphoramide and bis ($\beta$-chloroethyl ether).

11. Process according to claim 1, wherein temperature is less than 225° C.

12. The process according to claim 1 wherein said polymer contains said olefinic unsaturation and said temperature is less than about 150° C.

13. The process according to claim 1 wherein said polymer contains aromatic groups and said temperature is less than about 200° C.

14. A process for the bulk sulfonation of hydrocarbon polymers, characterized before sulfonation, by the presence in said polymers of sulfonatable sites selected from the group consisting of olefinic unsaturation and arylene radicals, which comprises:
   (a) mechanically mixing said polymers or mixtures of hydrocarbon polymers comprising said polymers with a sulfonation reagent comprising sulfuric acid or sulfur trioxide or both, in the substantial absence of a solvent for said polymers at a temperature which is between the glass transition temperature and 250° C. for amorphous polymers and between the crystalline melting point and 250° C. for crystalline or semicrystalline polymers for a time sufficient to effect sulfonation; followed by (b) neutralization with a basic material selected from the group consisting of ammonia, mono and polyamines and basic compounds in which the cation is an element selected from the group consisting of Groups I-A, I-B, II-A and II-B of the Periodic Table of Elements, aluminum, antimony, and lead; and the anion is selected from the group consisting of oxides, hydroxides, $C_1$ to $C_5$ alkoxides, carbonates and fatty acids; followed by (c) recovering of the neutralized sulfonated polymer.

15. Process according to claim 14, wherein said hydrocarbon polymers are selected from the group consisting of:

(a) homopolymers and copolymers of one or more alkenyl hydrocarbons having the general formula Ar-C(R)=$CH_2$ wherein Ar is a monovalent sulfonatable aromatic radical and R is hydrogen or methyl;

(b) copolymers of one or more $C_4$ to $C_{10}$ conjugated diolefins with one or more $C_8$ to $C_{12}$ vinyl aromatic hydrocarbons;

(c) random copolymers of one or more $C_8$ to $C_{12}$ vinyl aromatic hydrocarbons comprising about 40 to 60 weight percent of said vinyl aromatic with one or more Type III $C_4$ to $C_8$ monoolefins;

(d) random elastomeric copolymers of one or more $C_4$ to $C_{10}$ conjugated diolefins with one or more Type III $C_4$ to $C_8$ monoolefins; and (e) random interpolymers of one or more Type I $C_2$ to $C_{18}$ monoolefins and one or more $C_6$ to $C_{12}$ nonconjugated acyclic or alicyclic diolefins.

16. Process according to claim 14, wherein said sulfonation reagent is a pre-formed acetyl sulfate.

17. Process according to claim 14, wherein said sulfonation reagent is prepared in situ by the serial addition of acetic anhydride and sulfuric acid.

18. Process according to claim 14, wherein said sulfonation reagent is prepared in situ by the alternate addition of acetic anhydride and sulfuric acid.

19. Process according to claim 14, wherein said sulfonation reagent comprises a complex or coordination compound of sulfuric acid or sulfur trioxide with a Lewis base.

20. Process according to claim 14, wherein said polymer is an unmodified polystyrene.

21. Process according to claim 14, wherein said polymer is a butyl rubber.

22. Process according to claim 14, wherein said polymer is an EPDM selected from the group consisting of terpolymers of ethylene, propylene and 1,4-hexadiene; and terpolymers of ethylene, propylene and 5-ethylidene-2-norbornene.

23. Process according to claim 14, wherein said sulfonation reagent is selected from the group consisting of adducts or complexes of sulfuric acid or sulfur trioxide with diethyl ether, acetic acid, acetic anhydride, trifluoroacetic acid, trifluoroacetic anhydride, benzoic acid, benzoic anhydride, propionic acid, n-butyric acid, dioxane, tetrahydrofuran, 1,4-oxathiane, pyridine, dimethylaniline, n-ethylmorpholine, dimethyl formamide, dimethyl sulfone, dimethyl sulfoxide, triethyl phosphate hexamethyl phosphoramide and bis ($\beta$-chloroethyl ether).

24. Process according to claim 14, wherein said basic material is selected from the group consisting of zinc oxide, zinc stearate, magnesium oxide and magnesium hydroxide.

* * * * *